March 11, 1947.  D. D. BIRT  2,417,186
GRAIN LOADER
Filed Jan. 26, 1945  4 Sheets-Sheet 1
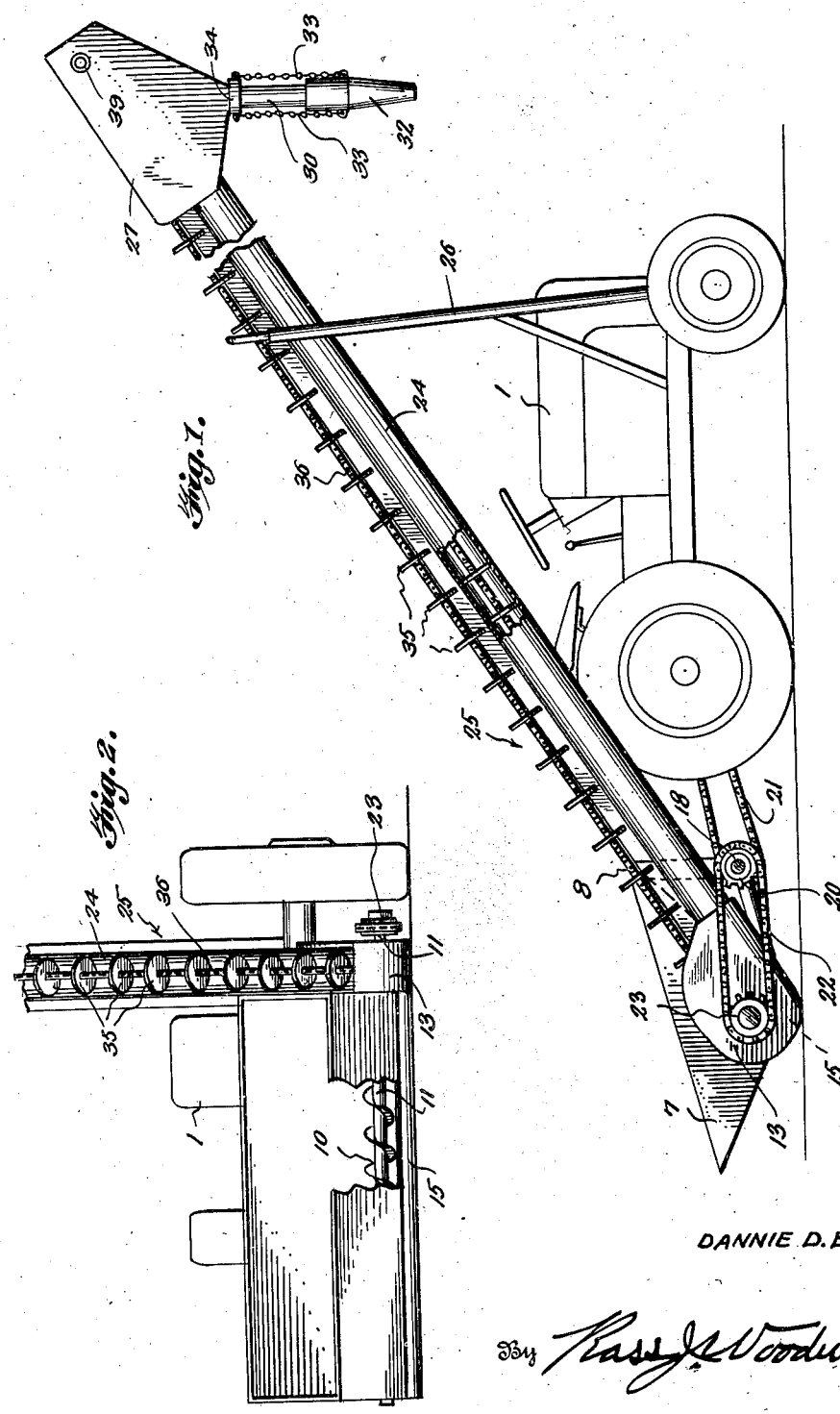
Inventor
DANNIE D. BIRT March 11, 1947. D. D. BIRT 2,417,186
GRAIN LOADER
Filed Jan. 26, 1945 4 Sheets-Sheet 2
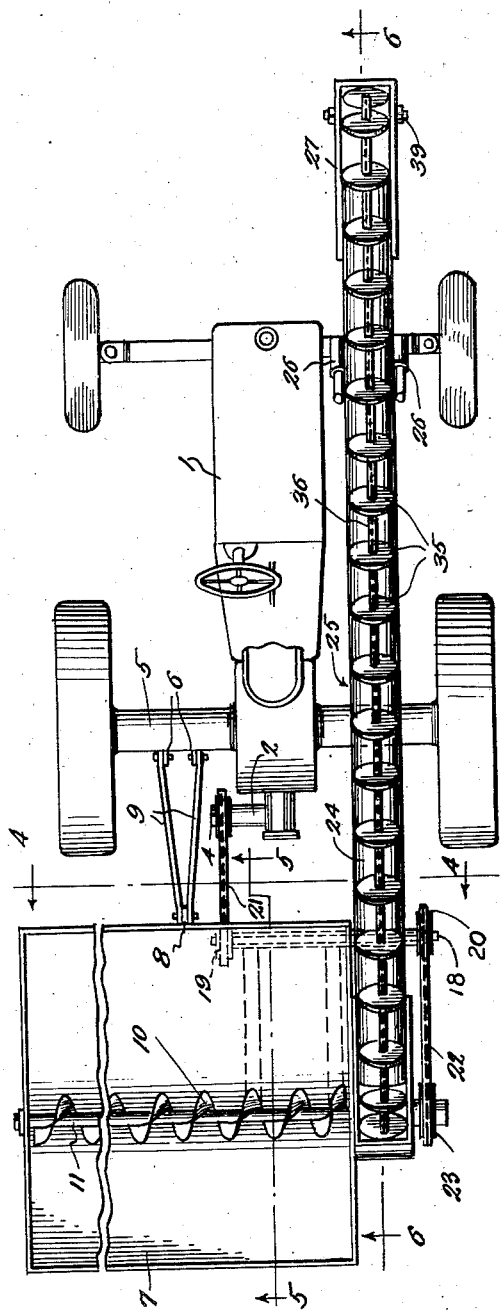
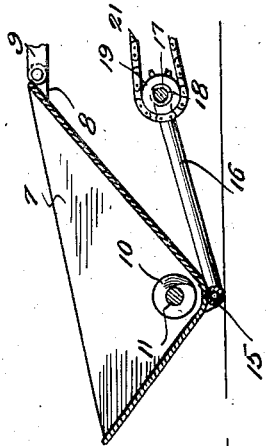
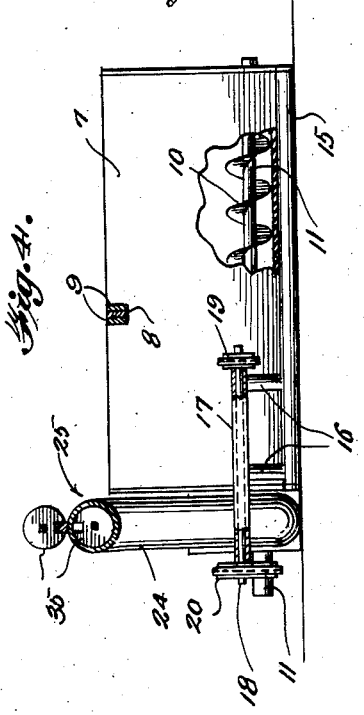
Inventor
DANNIE D. BIRT March 11, 1947.  D. D. BIRT  2,417,186
GRAIN LOADER
Filed Jan. 26, 1945  4 Sheets-Sheet 3
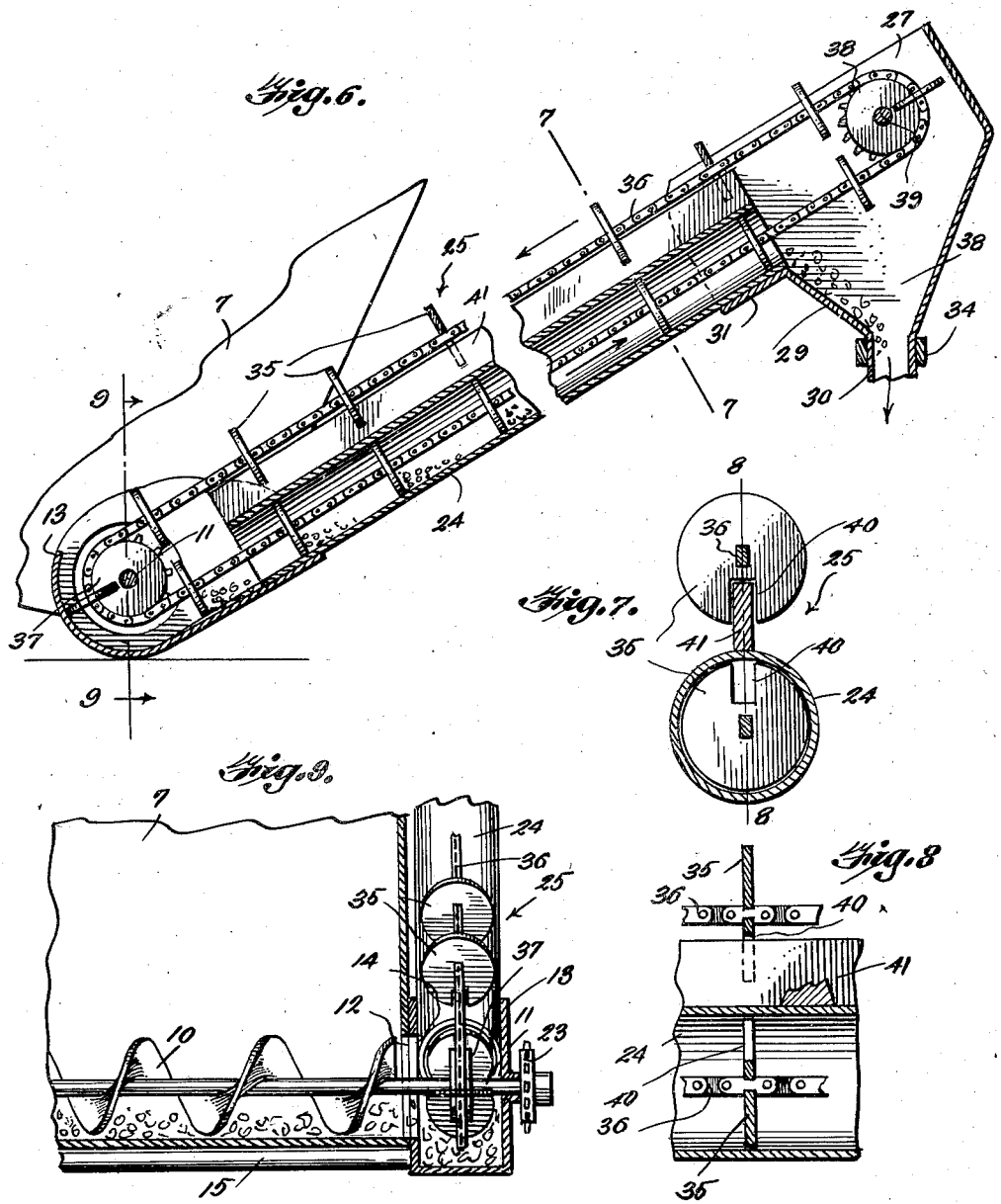
Inventor
DANNIE D. BIRT March 11, 1947.   D. D. BIRT   2,417,186
GRAIN LOADER
Filed Jan. 26, 1945   4 Sheets-Sheet 4
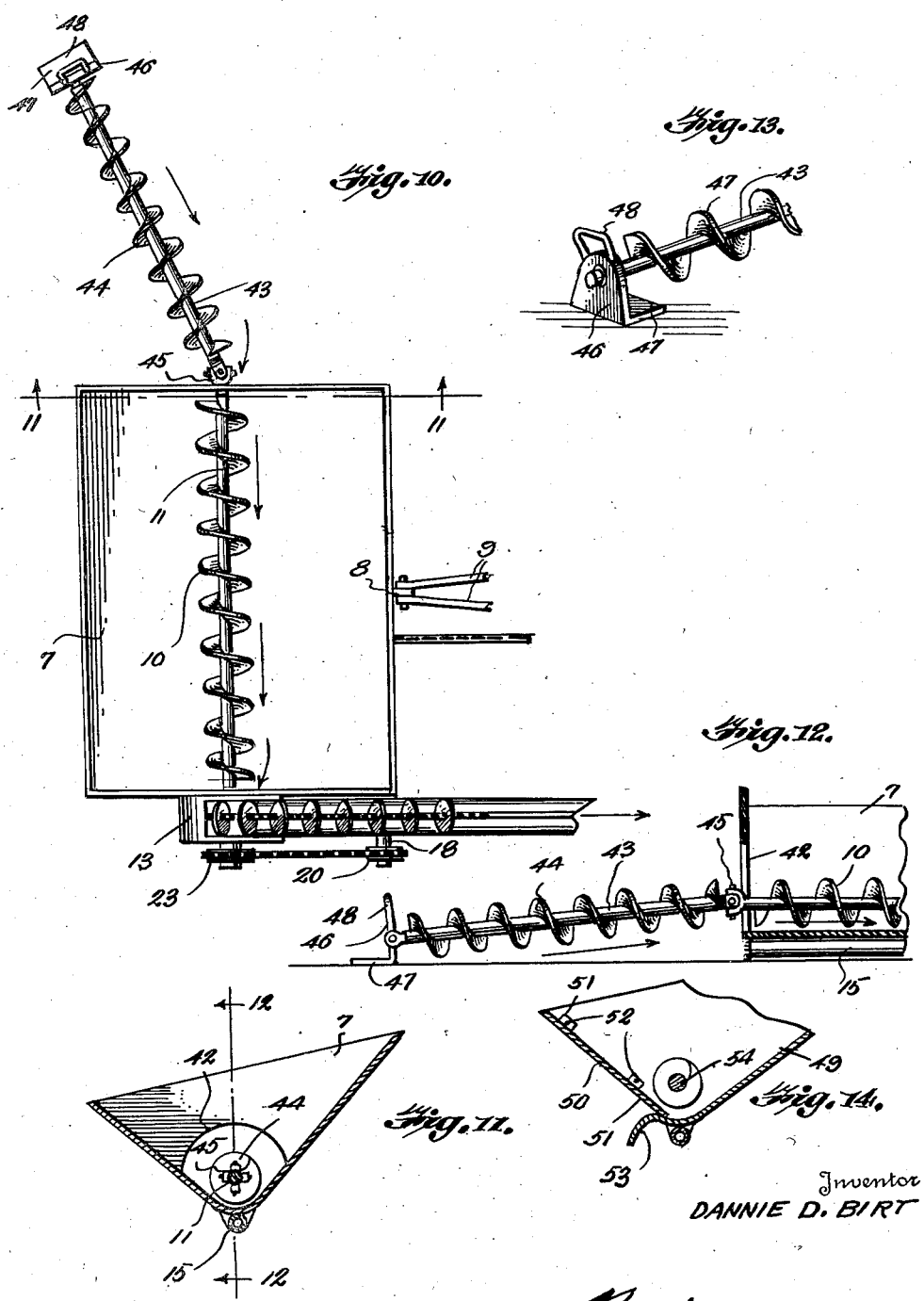
Inventor
DANNIE D. BIRT Patented Mar. 11, 1947

2,417,186

UNITED STATES PATENT OFFICE 2,417,186

GRAIN LOADER

Dannie D. Birt, Guyman, Okla.

Application January 26, 1945, Serial No. 574,736

2 Claims. (Cl. 198—99)

This invention relates to a loader and more particularly to a loader by means of which grain and other loosely running material may be transferred from a pile upon the ground to a wagon for transfer to a storage bin, elevator, or other location at which delivery is to be made.

One object of the invention is to provide a loader which is of such construction that it may be applied to a tractor by means of which it is transported to a place of use and by which the loader is operated at the place of use.

Another object of the invention is to provide a loader of such formation that its receiving end is located back of the tractor and its delivery spout projects forwardly over the tractor where it terminates in a depending spout by means of which grain is delivered into a vehicle.

Another object of the invention is to provide the loader with a hopper at its rear end into which grain may be shoveled or otherwise transferred from a pile upon the ground, there being a conveyor in the trough for removing grain from the trough and delivering it to the lower end of an upwardly extending conveyor through which the grain is carried and discharged into a vehicle.

Another object is to so form and mount the two conveyors that both may be driven from the power take-off of a tractor with which the loader is associated.

A further object is to provide a loader wherein the spiral conveyor in the hopper has an extending projection from the hopper and capable of being swung transversely to positions for engaging grain in a pile and moving the grain into the hopper.

Another object of the invention is to provide the upwardly inclined conveyor with a head at its upper end into which grain is delivered by an endless conveyor, the head being so formed that the grain will flow toward a discharge spout at the bottom of the head.

Still another object of the invention is to provide an upwardly inclined conveyor including a tube and casings at upper and lower ends thereof on which sprocket wheels are rotatably mounted for engagement by an endless sprocket chain carrying blades for moving grain upwardly through the tube, there being a strip mounted upon the tube for engaging the blades and guiding downward movement of the upper flight of the chain externally of the tube.

And the invention has as a still further object to provide a loader which is simple in construction and capable of being readily applied to a tractor of conventional construction.

In the accompanying drawings:

Fig. 1 is a side elevation of the improved grain loader.

Fig. 2 is a view showing the lower portion of the loader in rear elevation, the upper portion of the inclined conveyor being broken off.

Fig. 3 is a top plan view of the loader.

Fig. 4 is a transverse sectional view on the line 4—4 of Fig. 3.

Fig. 5 is a longitudinal sectional view on the line 5—5 of Fig. 3.

Fig. 6 is a sectional view on an enlarged scale, taken longitudinally through the inclined conveyor on the line 6—6 of Fig. 3.

Fig. 7 is a fragmentary sectional view on the line 7—7 of Fig. 6.

Fig. 8 is a sectional view on the line 8—8 of Fig. 7.

Fig. 9 is a fragmentary sectional view on the line 9—9 of Fig. 6.

Fig. 10 is a top plan view of the lower portion of a loader wherein the spiral conveyor in the hopper has an extension projecting from a side of the hopper.

Fig. 11 is a sectional view on the line 11—11 of Fig. 10.

Fig. 12 is a fragmentary sectional view on the line 12—12 of Fig. 11.

Fig. 13 is a perspective view of the outer end of the conveyor which projects from a side of the hopper.

Fig. 14 is a sectional view showing a modified construction.

This improved loader is particularly adapted for transferring grain from a pile on the ground into a wagon, truck, or other vehicle in which it is to be transported to a bin, grain elevator, or other place of storage, but it is to be understood that it may be used for removing any free flowing material from a pile and depositing the same in a vehicle.

The tractor 1 shown in Figs. 1 and 3, and with which the improved loader is associated, is of conventional construction and is provided with the usual power take-off 2 including a rotary shaft 3 upon which a sprocket wheel 4 is mounted. At one side of the tractor the rear axle casing 5 carries ears 6 projecting rearwardly therefrom.

The improved loader has a hopper 7 which may be formed of sheet metal or other suitable material and is mounted back of the tractor transversely thereof when in use. The hopper is substantially V-shaped in cross section, as shown in Fig. 5, and, at its front carries a lug or ear 8 to which are pivoted hitch bars 9 which diverge forwardly from the hopper and have their front ends pivoted to the ears 6. A spiral conveyor 10 extends along the bottom of the hopper between side walls thereof and the shaft 11 of this conveyor is rotatably mounted through the side walls with one end portion passing through an opening 12 and passing through a casing 13 forming the lower end portion of an upwardly inclined conveyor to be hereinafter more fully described. This casing has its inner side wall formed with an opening 14 registering with opening 12 and, in order to support the casing 13 and reinforce the hopper along its bottom, there has been provided a tube or bar 15 which extends along the bottom of the hopper and carries arms 16 which project forwardly and carry a tube 17 through which a shaft 18 is rotatably mounted. This shaft 18 carries sprocket wheels 19 and 20 at its inner and outer ends and, in order to transmit rotary motion from the power take-off of the tractor, to the shaft 18, there has been provided a sprocket chain 21 trained about the sprocket wheels 4 and 19. A sprocket chain 22 which is trained about the sprocket wheels 20 and 23 carried by the shaft 18 and the shaft 11 of the spiral conveyor serves to transmit rotary motion to its spiral conveyor.

When grain is shoveled into the hopper, the spiral conveyor 10 moves it transversely thereof and through the registering openings 12 and 14 into the casing 13 from which it is carried upwardly through the tube 24 of the inclined conveyor which is indicated in general by the numeral 25. Since the lower end of the tube is fixedly secured to the casing 13, the tube and casing may be swung as a unit about the shaft 11 in a vertical direction from a reclining position to a raised position where it is supported at a desired incline by props 26 carried by the front axle of the tractor. A large hood or casing 27 is mounted at the front end of the tube 24, and upon referring to Fig. 6, it will be seen that this casing is open at its top and has its lower portion formed with sloping front and rear walls 28 and 29 which converge downwardly to a depending spout 30 through which grain is discharged from the hood 27. The rear wall 29 extends directly from the neck 31 of the hood in which the front end of tube 24 is secured and the angle of the front and rear walls is such that, as grain is discharged from the tube into the hood, it will flow to and through the neck 30. A nozzle 32 suspended by chains 33 from a collar 34 surrounding the upper end of the spout 30 is provided in order that grain flowing from the spout may be distributed in the body of a truck or other vehicle driven into position under the spout.

The grain is moved upwardly through the tube 24 by plates 35 carried by an endless sprocket chain 36 which extends longitudinally of the tube and is trained about sprocket wheels 37 and 38, the sprocket wheel 37 being carried by the shaft 11 of the spiral conveyor 10 within the casing 13 and the sprocket wheel 38 being rotatably mounted in the hood 27 by its shaft 39 which is journaled through side walls of the hood. The lower flight of the chain 36 passes longitudinally through the tube and its upper flight is spaced upwardly from the tube. The plates 35 are circular and of such diameter that they fit snugly within the tube so that grain will be carried upwardly through the tube and each plate or disc is formed with a diametrically extending slot 40 of sufficient width for straddling the sprocket wheels 37 and 38 during movement of the chain about the wheels. The slots 40 are also intended to receive a strip 41 which extends longitudinally of the tube and rests upon one edge face so that it projects upwardly from the tube, as shown in Figs. 7 and 8. The strip extends the full length of the tube, as shown in Fig. 6, and serves as a guide for engagement by the plates and preventing the upper flight of the sprocket chain from having transverse movement which would be liable to subject the chain to transverse stress and displace the chain from the sprocket wheels 37 and 38.

A loader so formed may be readily transported to a pile of grain which it is desired to load into vehicles for transportation to another location and the tractor backed toward the pile of grain until the hopper is thrust into the grain or in such position that grain may be shoveled from the pile into the hopper. The grain in the hopper is moved toward the inner side thereof by the spiral conveyor 10 and through the registering openings 12 and 14 into the casing or shoe 13 at the lower end of the conveyor 25. This conveyor 25 is adjusted so that its upper end is disposed at such height that a wagon or other vehicle may be driven into position under it and filled with grain which is carried upwardly through the tube 24 by the plates 35 and discharged from the tube into the hood 27 from which it will flow through the spout 30 and the nozzle 42 into the vehicle.

In Figs. 7 through 13, there has been illustrated an embodiment of the invention wherein the outer side wall of the hopper is formed with an opening 42 through which the shaft 11 of the spiral conveyor 10 passes. This protruding end of the shaft 11 is connected with the shaft 43 of an auxiliary spiral conveyor 44 by a universal joint 45 so that the auxiliary conveyor may be swung transversely of the conveyor 10 into portions of a pile of grain not directly opposite the opening 42 and the grain moved toward the hopper and through the opening 42 into the hopper, where it will be taken up by the conveyor 10 and moved along the bottom of the hopper to the registering openings through which it passes into the shoe or casing 13. The outer end of the shaft 43 of the conveyor 44 is rotatably mounted through a support 46 having its lower portion formed with a base 47 and, at its upper end, carries an upstanding handle 48 so that the support and the auxiliary conveyor may be picked up and moved to an adjusted position.

In Fig. 14 of the drawings, there has been shown a modified construction wherein the hopper 49, corresponding to hopper 7, has its rear wall 50 formed separate from the end walls and provided at each end with inwardly extending ears 51 through which bolts 52 are passed to removably mount the rear wall. The bottom of the hopper is extended to form a lip 53 which projects from the hopper under the rear wall 50 and is curved downwardly so that when the rear wall is removed the open rear end portion of the hopper may be shoved into a pile of grain and the lip 53 guide the grain into the hopper where it gathers around the spiral conveyor 54 for discharge from the hopper by the conveyor. When this embodiment of the invention is in use, grain may be easily removed from a pile as it is merely necessary to back a tractor and the loading mechanism carried thereby toward a pile of grain and push the open hopper into the grain.

What is claimed is:

1. A loader comprising a hopper having side walls and front and rear walls converging downwardly and connected with each other to form a bottom for the hopper, a conveyor at a side of the hopper including a tube extending forwardly at an upward incline and having a casing at its rear end, the casing and the adjoining side wall of the hopper being formed with registering openings, a spiral conveyor extending along the bottom of the hopper and having a shaft rotatably mounted with a portion passing through the registering openings and transversely through the casing and projecting outwardly from the outer side of the casing, a ground-engaging bar along the under face of the bottom of the hopper between the casing and the other side of the hopper and serving to reinforce the hopper, arms extending from said bar in front of the hopper, a horizontal tube carried by said arms and projecting outwardly from the hopper under the conveyor tube, a drive shaft rotatably mounted through the horizontal tube with its outer end projecting therefrom, means for transmitting rotary motion from the outer end of the drive shaft to the outer end of the conveyor shaft, means for hitching the hopper to a towing vehicle, means for imparting rotary motion to the drive shaft, and endless conveyor means extending longitudinally through the conveyor tube and the casing and driven from the portion of the conveyor shaft passing through the casing.

2. A loader comprising a hopper having side walls and front and rear walls, a conveyor at a side of the hopper including a tube extending forwardly from the hopper and having a casing at its rear end, the casing and the adjoining side wall of the hopper being formed with registering openings, a spiral conveyor extending along the bottom of the hopper and having a shaft passing through the registering openings and transversely through the casing and journaled through the outer side of the casing, said shaft mounting the conveyor tube and its casing for vertical tilting to adjusted positions, a drive shaft rotatably mounted in front of said hopper, means for transmitting rotary motion from the drive shaft to the outer end of the conveyor shaft, a sprocket wheel mounted upon the conveyor shaft within the casing, endless conveyor means extending through the conveyor tube and the casing and trained about the sprocket wheel, and means for transmitting rotary motion to the drive shaft.

DANNIE D. BIRT.

REFERENCES CITED

The following references are of record in the file of this patent:

UNITED STATES PATENTS

| Number | Name | Date |
|---|---|---|
| 1,117,619 | Adams | Nov. 17, 1914 |
| 1,163,057 | Adams | Dec. 7, 1915 |
| 1,165,460 | Steele | Dec. 28, 1915 |
| 1,320,684 | Hackstedde | Nov. 4, 1919 |
| 2,057,403 | Vali et al. | Oct. 13, 1936 |
| 2,303,684 | Cook | Dec. 1, 1942 |
| 2,325,833 | Cook | Aug. 3, 1943 |
| 2,013,582 | Preisser | Sept. 3, 1935 |
| 2,390,286 | Adams | Dec. 4, 1945 |